Figure 1:
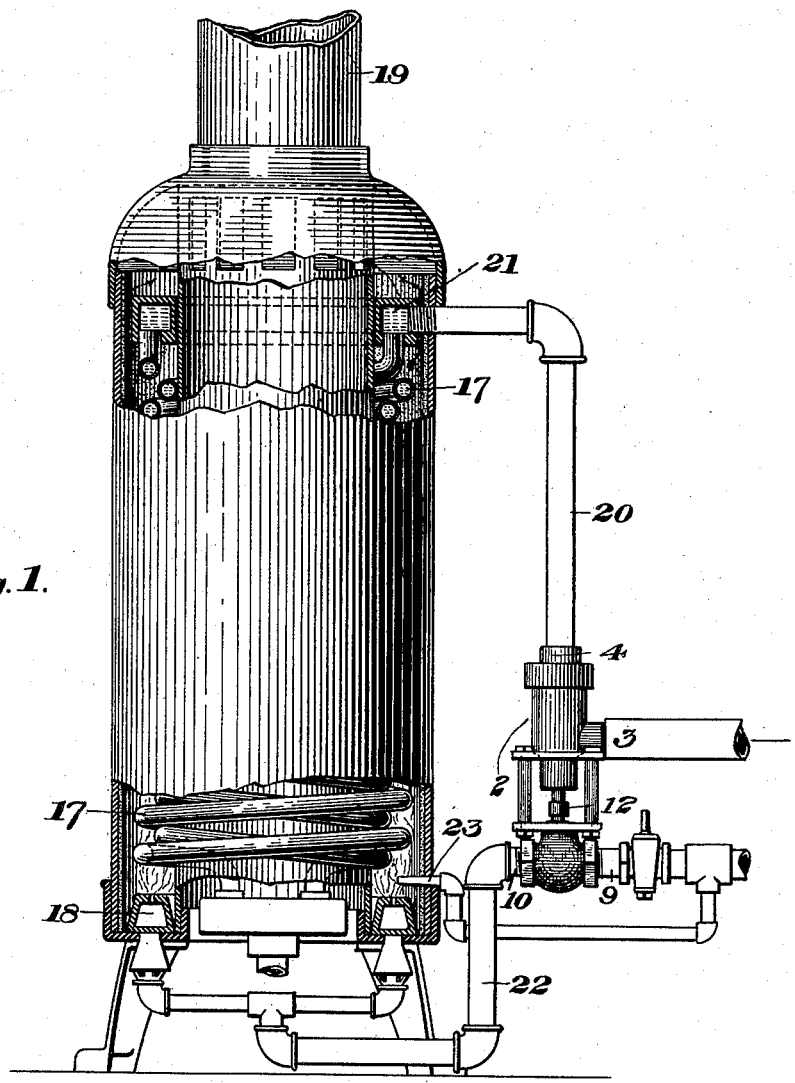

(No Model.)

2 Sheets—Sheet 1.

J. FARRELL.
WATER REGULATING APPARATUS.

No. 591,161. Patented Oct. 5, 1897.

WITNESSES

INVENTOR (No Model.) 2 Sheets—Sheet 2.
J. FARRELL.
WATER REGULATING APPARATUS.
No. 591,161. Patented Oct. 5, 1897.
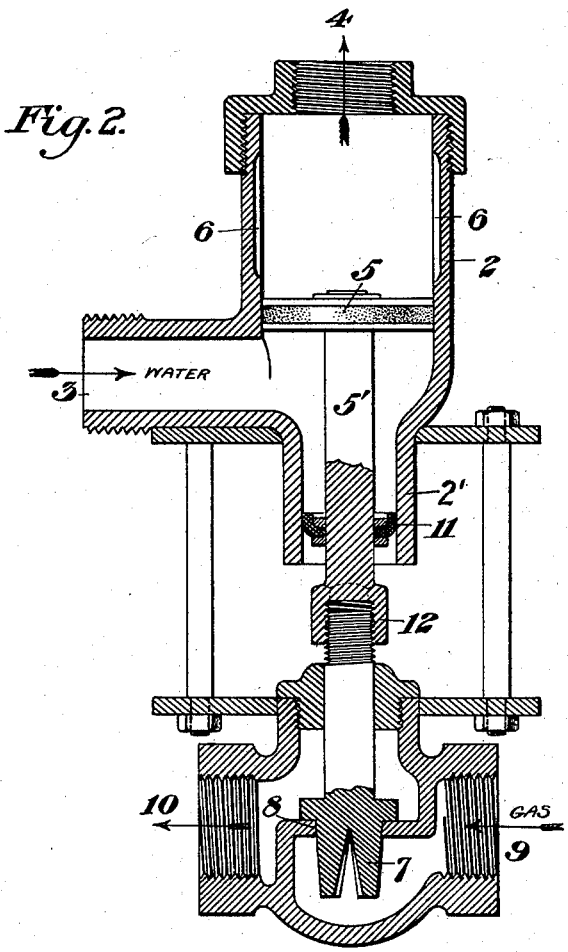
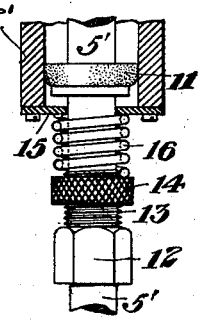
WITNESSES
INVENTOR
John Farrell
by Bakewell & Bakewell
his Attorneys.

UNITED STATES PATENT OFFICE.

JOHN FARRELL, OF PITTSBURG, PENNSYLVANIA.

WATER-REGULATING APPARATUS.

SPECIFICATION forming part of Letters Patent No. 591,161, dated October 5, 1897.

Application filed April 17, 1897. Serial No. 632,602. (No model.)

*To all whom it may concern:*

Be it known that I, JOHN FARRELL, of Pittsburg, in the county of Allegheny and State of Pennsylvania, have invented new and useful Improvements in Water-Regulating Apparatus, of which the following is a full, clear, and exact description, reference being had to the accompanying drawings, forming part of this specification, in which—

Figure 1 is a side elevation, partly broken away, showing one form of water-heater provided with my improved regulating apparatus. Fig. 2 is a vertical central section of one form of my regulating apparatus, and Fig. 3 is a detail view showing my improved form of stem.

The purpose of my invention is to provide means for controlling the supply of gas to automatic water-heaters, in such manner that when the flow of water stops the gas shall also be immediately cut off.

In the drawings, referring to Figs. 1 and 2, 2 represents the regulating-case, having a water-inlet passage 3, leading from the main supply-pipe, and an outlet-passage 4, leading to the water-heater, through which the water flows and in which it is subjected to the heat of the gas.

5 represents a piston-valve set in a chamber 2' in the path of the water flowing to the outlet, and in said chamber is a port or enlargement 6. The piston or pressure-plate 5 has a stem 5', to which is connected a valve 7, controlling a port 8, through which gas passes from a gas-inlet 9 to the burner-port 10.

11 is a smaller piston or annular pressure-plate on the stem 5', exposed to the pressure of water in the opposite direction from the piston 5.

I show the above apparatus as connected up to an ordinary form of heater, in which 17 is the water-coil, 18 the burner, and 19 the offtake.

20 is a pipe leading from the upper end of the regulator to the box 21 at the upper end of the coil, and 22 is the gas-pipe, leading from the port 10 to the burners.

23 is the usual pilot-light, arranged to ignite the gas when it is turned on.

When the parts are in the position shown in the drawings, the gas-valve is closed and the piston is at its lowest position. As soon, however, as any of the cocks in the water-service pipes are opened so as to cause a flow of water through the heater the pressure of the water-current moves the piston 5 so as to lift the gas-valve and to cause the flow of gas to the burner, at the same time bringing the piston opposite the ports 6 and permitting free flow of water to the heater.

When the water-current ceases by reason of the closing of the cock in the service-pipe, the pressure on both sides of the piston 5 is balanced and the water acting on the piston 11 forces down the valve-stem 5' and brings the valve 7 to its seat, thus shutting off the flow of gas. The burning of the flame at the burner is maintained by an ignition-jet. (Not shown.) The extent of lift of the stem 5' is regulated by an adjustable socket 12, by which the length of the stem is variable. The passage in the gas-valve is made tapering, so that the degree of its opening depends upon the extent of its motion, and the device therefore presents an easy mode of adjusting the operation of the valve.

I preferably employ with the above-recited parts a spring 16, which encircles the stem and bears at one end against an adjustable thumb-nut 14, fitting about a screw-threaded portion 13 of the stem, and at the other end against an annular plate 15, secured to the casing 2. When the water is shut off from the water-service pipe leading to the valve, the spring will automatically close the gas-valve and shut off the gas-supply, thus preventing waste of gas and injury to the heater.

The valve 7 may be modified in construction and may be operated by indirect connection with the pistons or pressure-plates. Other constructions of pressure-plate may also be employed. The essential feature of my invention is that the gas valve or cock is operated by positive action of the water in both directions.

I claim—

1. An automatic water-heater having a receptacle for water, a supply-pipe leading to the receptacle, a burner arranged to heat the same, a gas-supply pipe leading to the burner, said water-supply pipe having a chamber containing oppositely-acting pressure-plates or pistons subjected to the water-pressure, said chamber having a passage leading around one of the pistons when the water-current is flowing through the chamber, such piston being beyond the port and subject to balanced pressure when the water-current is stopped, the other piston being subject to a constant water-pressure, and a connection between the pistons and a valve in the gas-supply pipe; substantially as described.

2. An automatic water-heater having a receptacle for water and a gas-burner therefor, a water-supply pipe leading to the receptacle, a gas-supply pipe leading to the burner, a gas-valve having a tapered slot within the gas-supply pipe, a water-supply pipe having a chamber containing connected oppositely-acting pressure-plates or pistons, said chamber having a port leading around one piston when the water-current is flowing through the chamber, said piston being beyond the port and subject to balanced pressure when the water-current is stopped, the other piston being subject to constant water-pressure, and an adjustable connection between the stem of the pistons and the gas-valve; substantially as described.

In testimony whereof I have hereunto set my hand.

JOHN FARRELL.

Witnesses:
H. L. ANDREWS,
GEORGE I. HOLDSHIP.